(12) United States Patent
Schroeder

(10) Patent No.: US 7,967,893 B2
(45) Date of Patent: Jun. 28, 2011

(54) SUPERCRITICAL FLUID ENRICHMENT OF ISOTOPES

(75) Inventor: Terrence K. Schroeder, Bernardsville, NJ (US)

(73) Assignee: SWCE, Bernardsville, NJ (US)

( * ) Notice: Subject to any disclaimer, the term of this patent is extended or adjusted under 35 U.S.C. 154(b) by 636 days.

(21) Appl. No.: 11/809,423

(22) Filed: May 31, 2007

(65) Prior Publication Data
US 2010/0018392 A1    Jan. 28, 2010

Related U.S. Application Data

(60) Provisional application No. 60/809,743, filed on May 31, 2006.

(51) Int. Cl.
  B01D 53/24 (2006.01)
  B01D 59/20 (2006.01)
  B01D 53/30 (2006.01)

(52) U.S. Cl. .......... 95/35; 95/1; 95/8; 95/19; 95/22; 95/23; 95/26; 95/270; 96/417; 96/424; 96/421; 96/397; 55/406

(58) Field of Classification Search ............. 95/35, 116, 95/270, 1, 8, 19, 22, 23, 26, 34, 269; 55/392, 55/396, 434, 437, 447–450, 452, 401, 406; 210/651; 96/417
See application file for complete search history.

(56) References Cited

U.S. PATENT DOCUMENTS

| 3,108,955 | A | * | 10/1963 | Boyland | 494/74 |
| 3,613,989 | A | * | 10/1971 | Oyama et al. | 494/2 |
| 3,991,155 | A | * | 11/1976 | Ward | 423/19 |
| 3,998,610 | A | * | 12/1976 | Leith | 95/35 |
| 4,012,480 | A | * | 3/1977 | Delvalle | 423/10 |
| 4,097,247 | A | * | 6/1978 | Anderson | 95/33 |
| 4,167,244 | A | * | 9/1979 | Stark | 494/31 |
| 4,225,324 | A | * | 9/1980 | Gazda | 95/35 |
| 4,294,598 | A | * | 10/1981 | Gazda | 55/403 |
| 4,567,025 | A | * | 1/1986 | Peterson et al. | 204/157.2 |

(Continued)

FOREIGN PATENT DOCUMENTS
WO    WO 2008/05454    *    5/2008

OTHER PUBLICATIONS

Bukharin,Oleg; Jan. 2004; Russia's Gaseous Centrifuge Technology and Uranium Enrichment Complex; Program on Science and Global Security, Woodrow Wilson School of Public and International Affairs, Princeton University.*

(Continued)

Primary Examiner — Duane Smith
Assistant Examiner — Sonji Turner
(74) Attorney, Agent, or Firm — Porzio, Bromberg & Newman, PC

(57) ABSTRACT

A system and method for supercritical fluid enrichment of radioactive isotope/s are disclosed. The method involves pressurizing an outer chamber and an inner centrifugal chamber of a stage to supercritical pressure; supplying material including target isotope/s at supercritical pressure to the inner chamber; spinning the inner chamber to centrifuge the material including target isotope/s; providing a differential pressure between the inner chamber and the outer chamber; wherein windows in the inner chamber enable passage of the target isotope or an undesired isotope from the inner chamber to the outer chamber in response to the differential pressure.

19 Claims, 4 Drawing Sheets

U.S. PATENT DOCUMENTS

| | | | | |
|---|---|---|---|---|
| 4,708,709 | A | * | 11/1987 | Zeller ............................ 494/32 |
| 4,767,513 | A | | 8/1988 | Peterson et al. |
| 5,024,739 | A | * | 6/1991 | Maya ......................... 204/157.2 |
| 5,024,741 | A | * | 6/1991 | Maya ....................... 204/157.22 |
| 2007/0199830 | A1 | | 8/2007 | Farag |

OTHER PUBLICATIONS

Smyth, Henry De Wolf; Jul. 1945; Atomic Energy for Military Purposes (Content-2 pp, Chapter IX-12 pp, and Chapter X-11 pp), nuclearweaponarchive.org/Smyth/index.html.*

Bukharin, O. "Russia's Gaseous Centrifuge Technology and Uranium Enrichment Complex", In: Proram on Science and Global Security, Woodrow Wilson School of Public and International Affairs, Princeton University, Jan. 2004, pp. 1-42. [online] <http://www/ransac.org/Documents/bukharinrussianenrichmentcomplexjan2004.pdf5.

Albright et al., "India's Gas Centrifuge Program: Stopping Illicit Procurement and the Leakage of Technical Centrifuge Know-How", In: Institute for Science and International Security (ISIS), Mar. 10, 2006, pp. 1-11 [online] <http://isis-online.org/publications/southasi/indianprocurement.pdf>.

Makhijani et al., "Uranium Enrichment: Just Plain Facts to Fuel an Informed Debate on Nuclear Proliferation and Nuclear Power", In: Institute for Energy and Environmental Research for the Nuclear Policy Research Institute, Oct. 15, 2004, pp. 1-47 [online] <http://www.ieer.org/reports/uranium/enrichment.pdf>.

* cited by examiner

SUPERCRITICAL FLUID ENRICHMENT OF ISOTOPES

FIELD OF INVENTION

The present invention relates to isotope enrichment and more particularly to centrifuge isotope enrichment.

BACKGROUND OF THE INVENTION

Uranium has multiple isotopes, all of which are radioactive. Naturally occurring uranium nominally contains 99.28305% U-238, 0.7110% U-235, and 0.0054% U-234 by weight. The concentration of fissile $U^{235}$ nuclei in natural uranium is too low for the use of natural uranium as fuel in a light water reactor (LWR). Thus, isotope enrichment is necessary to increase the concentration of fissile $U^{235}$ nuclei to a suitable level. In particular, for use in a LWR, the percentage of the fissile uranium isotope $U^{235}$ has to be raised from the natural state of 0.71% to a reactor grade concentration of approximately 3%-5%.

Commercially available enrichment technologies include the gaseous diffusion process and the centrifuge process. Both of these processes require the prior conversion of uranium to the gaseous form of uranium hexafluoride ($UF_6$). Uranium ore is first mined and produced into uranium oxide (often called "yellowcake"). The uranium oxide is then combined with anhydrous hydrogen fluoride ("HF") and fluorine gas in a series of chemical reactions to form the chemical compound $UF_6$. Fluorine is a pale yellow, corrosive gas, which reacts with most organic and inorganic substances; elemental fluorine and the fluoride ion are highly toxic. The $UF_6$ is then enriched to increase the concentration of fissile $U^{235}$ nuclei.

Uranium hexafluoride is used in uranium processing because its ability to be a solid, liquid, or gas, depending on temperatures and pressures commonly used in industrial processes make its use very convenient. The product stream of enriched $UF_6$ obtained is converted to $UO_2$ for further processing to nuclear fuel assemblies.

The enrichment process not only produces the enriched product, but also generates a waste stream or tails of uranium hexafluoride depleted in $U^{235}$, typically with a concentration of 0.2%-0.35%. It is important to note that these tails represent a significant percentage of the fissile uranium isotope $U^{235}$ found in naturally occurring uranium which is not extracted by conventional enrichment processes.

ASTM C787-06 "Standard Specification for Uranium Hexafluoride for Enrichment," ASTM International, deals with uranium hexafluoride ($UF_6$) intended for feeding to an enrichment plant and is incorporated by reference as if fully set out herein. Described therein is $UF_6$ derived from unirradiated natural uranium and $UF_6$ derived from irradiated uranium that has been reprocessed and converted to $UF_6$ for enrichment and subsequent reuse. The reference provides information: to define the impurity and uranium isotope limits for commercial $UF_6$ feedstock so that the corresponding enriched uranium is essentially equivalent to enriched uranium made entirely from virgin natural $UF_6$; and to define additional limits for reprocessed $UF_6$ (or any mixture of reprocessed $UF_6$ and commercial $UF_6$).

Present enrichment processes utilize large volumes of low density feedstock which is enriched within large expansive devices. These processes result in limited efficiency and/or enrichment, as well as the creation of massive contaminated structures which require extremely careful handling and long term disposal for safety reasons.

Therefore there is a need for an enrichment process capable of handling higher density feed stock as well as reducing the number/size of the devices and the contaminated structures which require extremely careful handling and long term disposal. There is also a need for an enrichment process that is more efficient than conventional enrichment processes.

SUMMARY OF THE INVENTION

The present invention is a system and method for supercritical fluid enrichment of isotopes including radioactive isotopes. In one embodiment of the invention, the method for supercritical fluid enrichment of isotopes includes pressurizing an enrichment stage having an outer chamber and an inner chamber with a window to a supercritical pressure, supplying a feedstock including a target isotope to the inner chamber at supercritical pressure, spinning the inner chamber to centrifuge the feedstock, and producing a differential pressure between the chambers such that an enriched portion of the feedstock having a greater concentration of the target isotope than the feedstock passes though the at least one window from the inner chamber to the outer chamber. A depleted portion of the feedstock having a lesser concentration of the target isotope than the feedstock remains in the inner chamber. Alternatively depending on the desired isotope, a depleted portion of the feedstock having a lower concentration of the target isotope than the feedstock may pass though the at least one window from the inner chamber to the outer chamber while the enriched portion of the feedstock having a greater concentration of the target isotope than the feedstock then remains in the inner chamber.

The method may include additional cascaded enrichment stages that are operated on in similar fashion with the enriched portion from a first enrichment stage supplied to the inner chamber of a next enrichment stage in the cascade. The enriched portion is then centrifuged in the inner chamber of the next enrichment stage which is pressurized at a supercritical pressure, before a differential pressure between the inner and outer chambers of the next enrichment stage is produced to enable a secondarily enriched portion of the enriched portion to pass though the a window into the outer chamber. The secondarily enriched portion thus has a greater concentration of the target isotope than the enriched portion. These steps may be repeated until an enriched portion having a predetermined concentration of the target isotope is produced. A solvent may also be used in the feedstock to assist in supercritical extraction and separation.

Likewise, cascaded depletion stages and enrichment of depleted materials may be utilized in that a depleted portion of the feedstock having a lesser concentration of the target isotope than the feedstock may be supplied from the inner chamber of a first stage to the inner chamber of a depletion stage or prior stage.

The differential pressure is provided for a predetermined period of time to permit a desired portion of target isotope to pass through the window. The timing, magnitude, or duration of the differential pressure may be varied and additionally may be synchronized for a predetermined temperature with feedstock volume, feedstock flow rate, enriched product volume, enriched product mass, depleted product volume, depleted product mass, target isotope concentration, target isotope mass, inner chamber rotational time, number of inner chamber rotations, inner chamber rotations since a most recent opening of the at least one window, or inner chamber rotations from a most recent closure of the at least one window. The method may be advantageously utilized to enrich radioactive isotopes, such as uranium cesium, cobalt, plutonium and strontium, and other non-radioactive heavy isotopes.

An embodiment of an apparatus for supercritical fluid enrichment of isotopes includes one or more stages, a first and second supercritical pump and a controller for directing the apparatus. The stages have an outer chamber and an inner centrifugal chamber for spinning feedstock and are connected in cascade. The inner centrifugal chamber includes a window. The window is resistant to perfusion and/or diffusion at pressures less than a predetermined pressure required to drive the target isotope through the window for a given target isotope concentration of the material provided to the inner centrifugal chamber of a given stage. The window is also operative to pass an enriched portion having an increased concentration of the target isotope than the material provided to the inner chamber through the window in response to a predetermined differential pressure between the outer and the inner centrifugal chambers.

The first supercritical pump produces a supercritical environment in the stage and the second supercritical pump produces the differential pressure between the outer and inner centrifugal chambers. The first and second supercritical pumps may be the same supercritical pump The controller directs the supercritical pumps and centrifuge and in response to application of differential pressure between the outer chamber and the inner centrifugal chamber, a target isotope portion of the feedstock passes from the inner chamber proximate the window through the window to the outer chamber. The controller may command variation of timing, magnitude, or duration of the differential pressure. This variation may also be synchronized with a measured feedstock volume, feedstock flow rate, enriched product volume, enriched product mass, depleted product volume, depleted product mass, target isotope concentration, target isotope mass, inner chamber rotational time, number of inner chamber rotations, inner chamber rotations since a most recent opening of the window, or inner chamber rotations from a most recent closure of the window.

The window may be formed via chemical vapor deposition of samarium, rubidium, palladium, nickel or other material resistant to chemical reaction with the feedstock in use on a foundation geometry such a zeolite alumina. Other window embodiments may include metal sponge geometries or combination of the chemical vapor deposition and sponge geometries.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Provided is a system and method for supercritical fluid enrichment of isotopes. Although the disclosed system and method for supercritical fluid enrichment of isotopes is particularly well suited for the enrichment of uranium hexafluoride, and is so described, it is equally well suited for use in the enrichment of other radioactive isotopes including but not limited to cesium, cobalt, plutonium and strontium. In addition, isotopes that are not radioactive may also be enriched using the system and method provided.

The physical properties of a pure element depend on its isotopic composition, but these differences are generally slight and not easy to exploit for the purposes of isotope separation. Processes implemented for the purposes of isotope separation use the difference in the mass of the isotopes to be separated, either directly such as by mass spectrometry and centrifugation, or indirectly such as by gas diffusion. The chemical properties of elements generally depend very little on the isotope considered, which makes isotope separation all the more difficult by chemical means.

Figure 1:
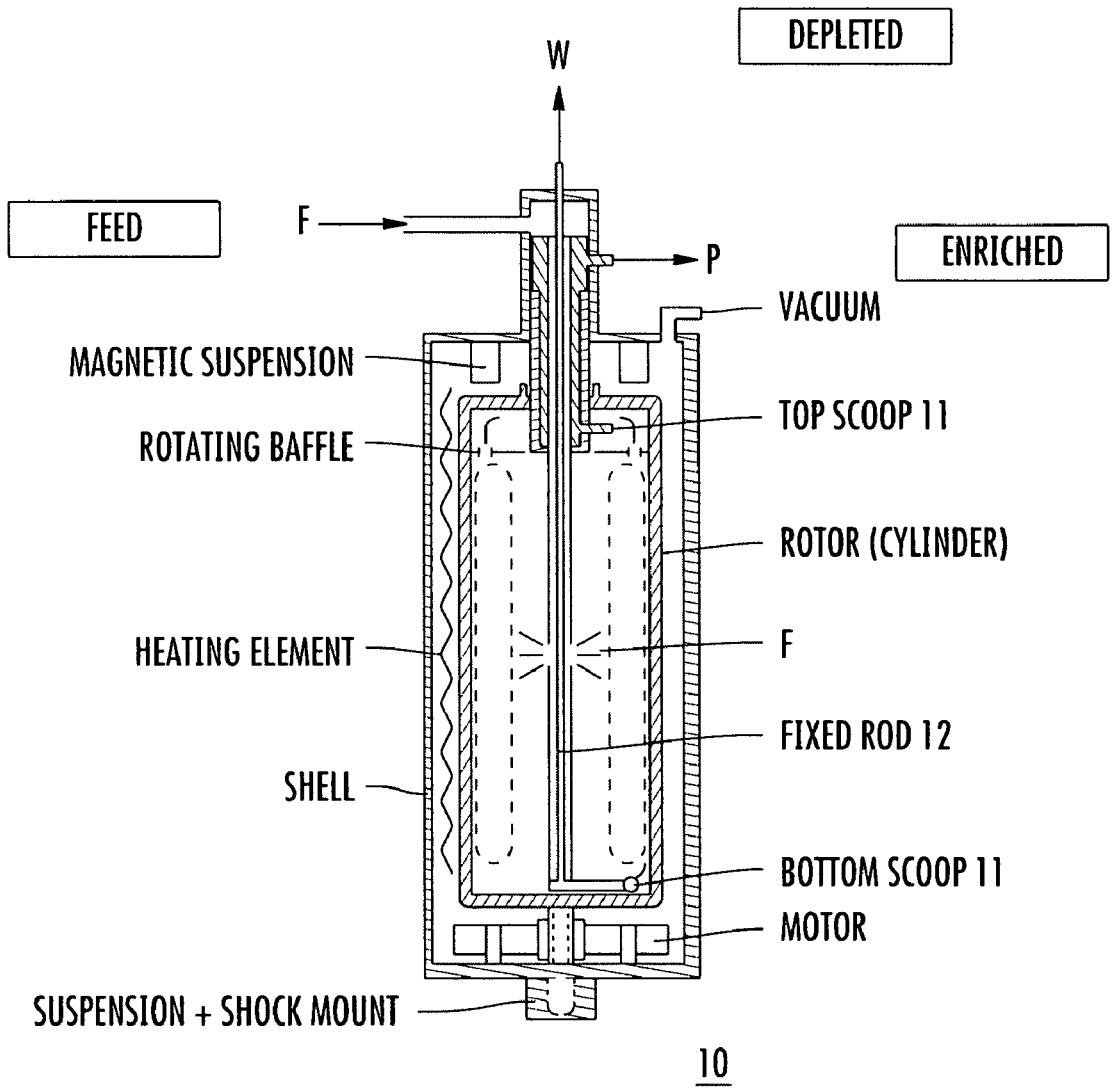
FIG. 1 is a diagram illustrating an example of a stage utilized in a conventional cascade isotope enrichment process.
Figure 2:
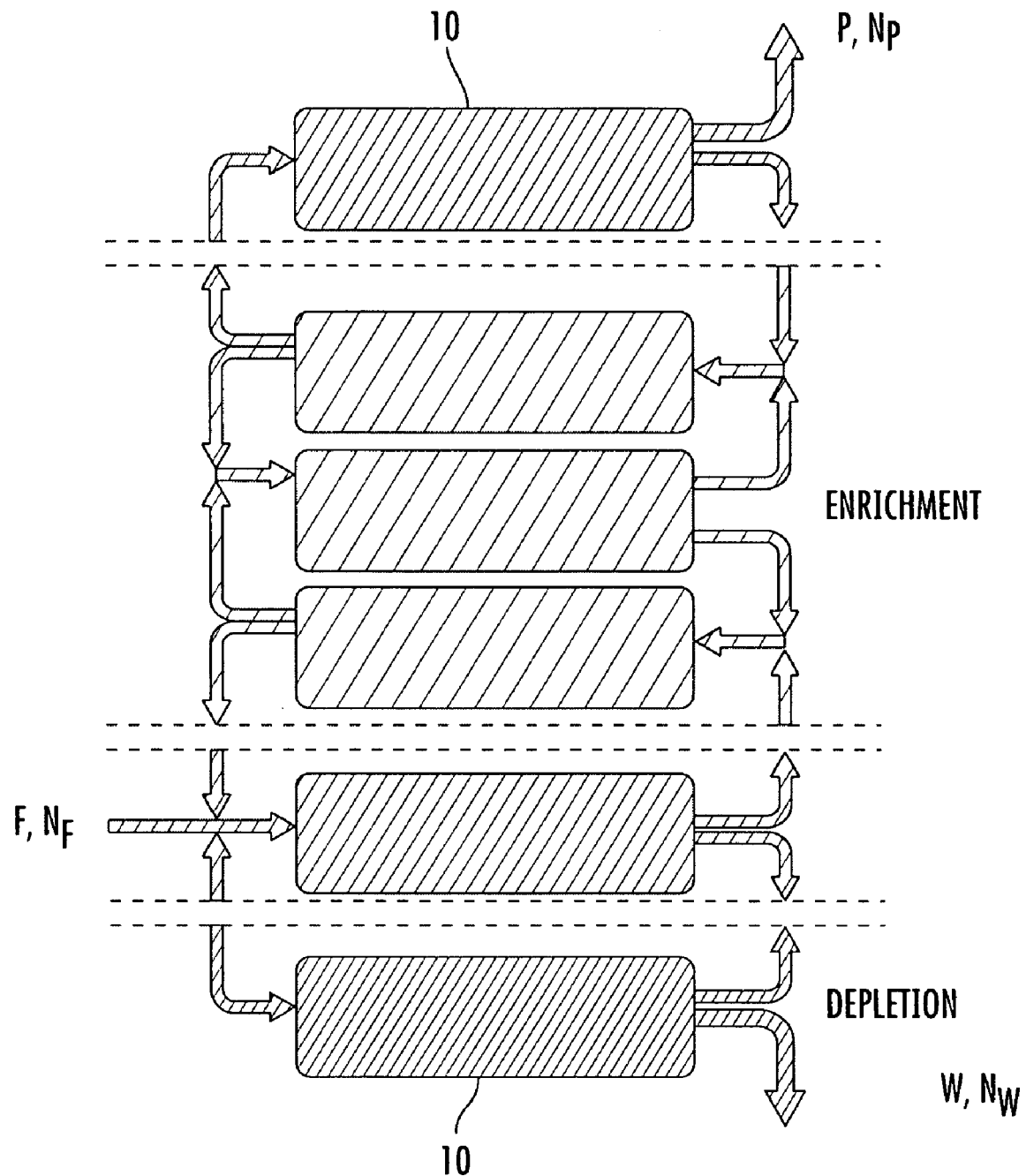
FIG. 2 is a diagram illustrating an exemplary cascade for isotope enrichment.

FIG. 1 illustrates an exemplary stage utilized in a conventional cascade isotope enrichment process. Referring to FIG. 2, there is shown an example cascade system for isotope enrichment. A cascade is often made up of two parts, the larger of the parts being devoted to the actual enrichment process. The other part is used for depleted residues of the enrichment process in order to optimize the separation performance of the cascade. Multiple stages may be utilized in each part of the cascade.

Each block 10 corresponds to a stage of separation; P (product), W (waste), F (feed) represent flows and Np, Nw, Nf the isotopic abundance (i.e., concentration). The degree of depletion chosen depends on economic optimization, taking into account the price of natural uranium and the cost of enrichment. The higher the value of Nw, the easier the enrichment process, but the greater the consumption of raw materials. In order to achieve successful economic optimization, the notion of separative work unit (SWU) is considered. A SWU is a complex unit of measurement integrating isotope abundance and the three corresponding flow rates (i.e., feed, product and waste).

Figure 3:
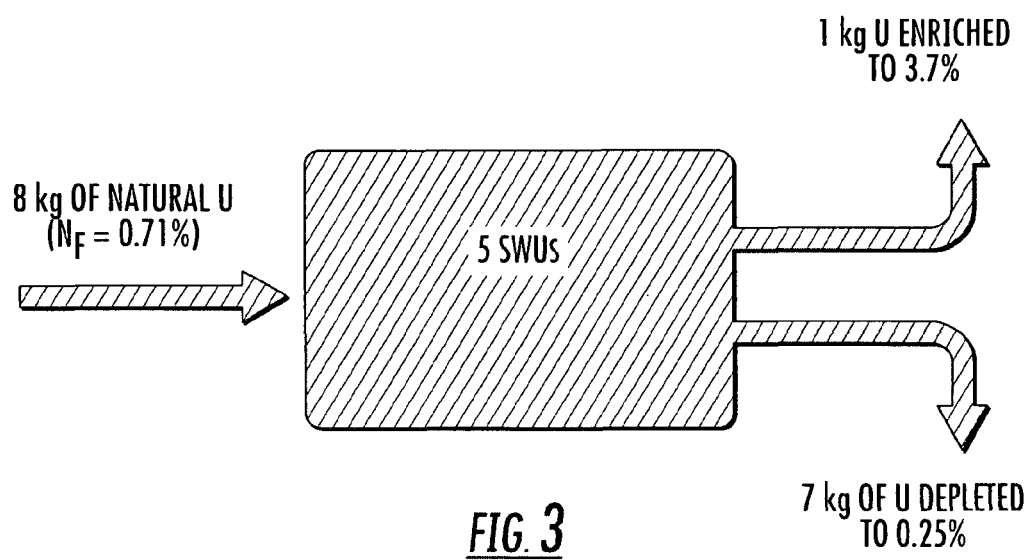
FIG. 3 is a block diagram detailing typical values for successful economic optimization in civil uranium enrichment.

Referring to FIG. 3 there is shown a block diagram detailing typical values for successful economic optimization in civil uranium enrichment. The SWU is also the commercial unit of measurement used for enrichment. A typical 900 MWe nuclear reactor consumes about 100,000 SWU/year, at a rate of 5 SWU/kg U, enriched to 3.7% from natural uranium. For each 8 kg of natural uranium, five SWU are required to produce 1 kg of enriched uranium with a 3.7% concentration of fissile uranium while at the same time 7 kg of depleted uranium with a 0.25% concentration of fissile uranium are produced.

Gaseous diffusion was the first uranium isotope enrichment process to be used on a large industrial scale. The gaseous diffusion process for uranium enrichment uses a gaseous compound of uranium, uranium hexafluoride ($UF_6$). The molecules of $U^{235}F_6$ (mass 349) travel faster than those of $U^{238}F_6$ (mass 352) and, over the same period of time, produce a greater number of impacts on the walls of the recipient containing them.

Given these conditions, if gaseous $UF_6$ is diffused through a porous wall, then the $U^{235}$ enrichment of a fraction of the gas downstream from the barrier will be slightly higher than for the total gas upstream from the barrier at the start. The elementary effect is small since the enrichment factor for $UF_6$ is low, in practice around 1.002.

Figure 4:
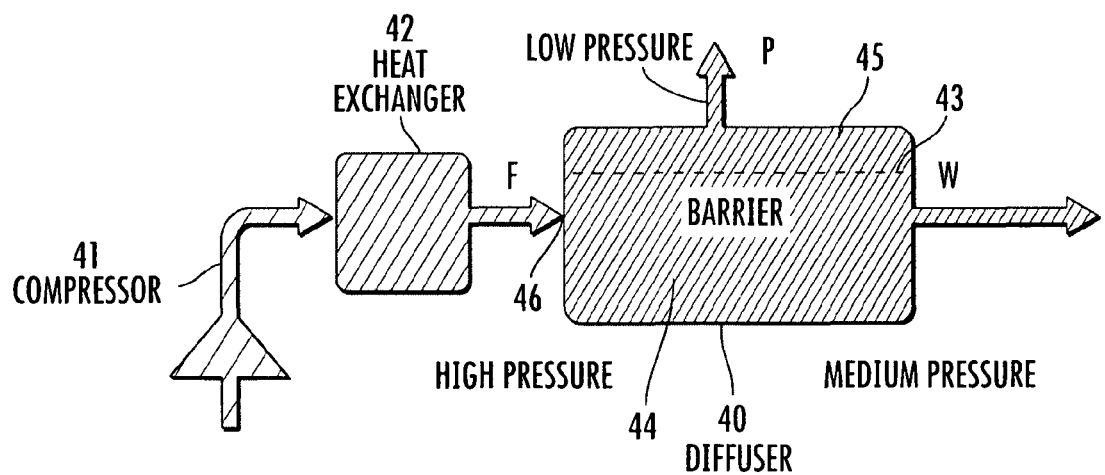
FIG. 4 is an exemplary illustration of a gaseous diffusion plant and its three main components.

A gaseous diffusion enrichment plant is designed on the basis of this minor physical effect. The separative device is made of up three main components which are shown in FIG. 4. The three main components include a diffuser 40, a compressor 41 and a heat exchanger 42. The diffuser 40 is an enclosure within which a large number of porous barriers 43 are set up in parallel. The barriers divide the inside of the enclosure into two compartments—a high-pressure compartment 44 (inside the barriers) and a low-pressure compartment 45 (outside the barriers). The separative product P is obtained from the low pressure compartment while waste W is from another location in the diffuser. The compressor 41 circulates the gas and brings it to the required pressure at the diffuser inlet 46 where the feed F is provided to the diffuser. The heat exchanger 42 removes the heat generated by the compressor.

The separation occurs over a series of parallel separating barriers. The number of barriers used is based on the number necessary to obtain the flow rate required at a given point of the cascade. Isotope separation by gaseous diffusion requires a great deal of energy, i.e. approximately some 2,400 kWh per SWU.

The centrifugal process is a very old process which accounts for only a small proportion of the SWUs produced in the world today, with the notable exception of the former USSR countries, where it remains the primary method utilized. The centrifugal process involves rotating a cylinder containing $UF_6$ gas at very high speed. The heaviest molecules gather at the edge of the cylinder, while the lightest ones mostly migrate towards the center. The typical enrichment factor for this process is 1.3, a much higher value than that obtained with gaseous diffusion.

Referring again to FIG. 1, there is shown a diagram of stage in the centrifuge enrichment process. Depleted and enriched fractions are caught by scoops—small tubes fitted at both ends of the cylinder at carefully optimized distances from the wall. As the gas is fed in and caught by the scoops, a countercurrent forms along the rotational axis 12 of the cylinder, which is vertical, and transforms the radial isotopic gradient into an axial gradient. With this optimized axial current, a centrifuge works rather like a distillation column: the current flowing upwards is gradually enriched with $U^{235}$ while the downward current is depleted.

With today's high-performance materials, the centrifuge process is close to its technological peak and appears to have exhausted any possibilities of further progress in terms of performance and cost. The cost structure of a centrifuging plant is dominated by high investment costs and extremely low operating costs. Centrifuges are highly reliable in the case of models that have reached technological maturity. The power consumption of centrifuging plants is very low, roughly 50 kWh per SWU, or 50 times less than a gaseous diffusion plant of the same capacity.

Figure 5A:
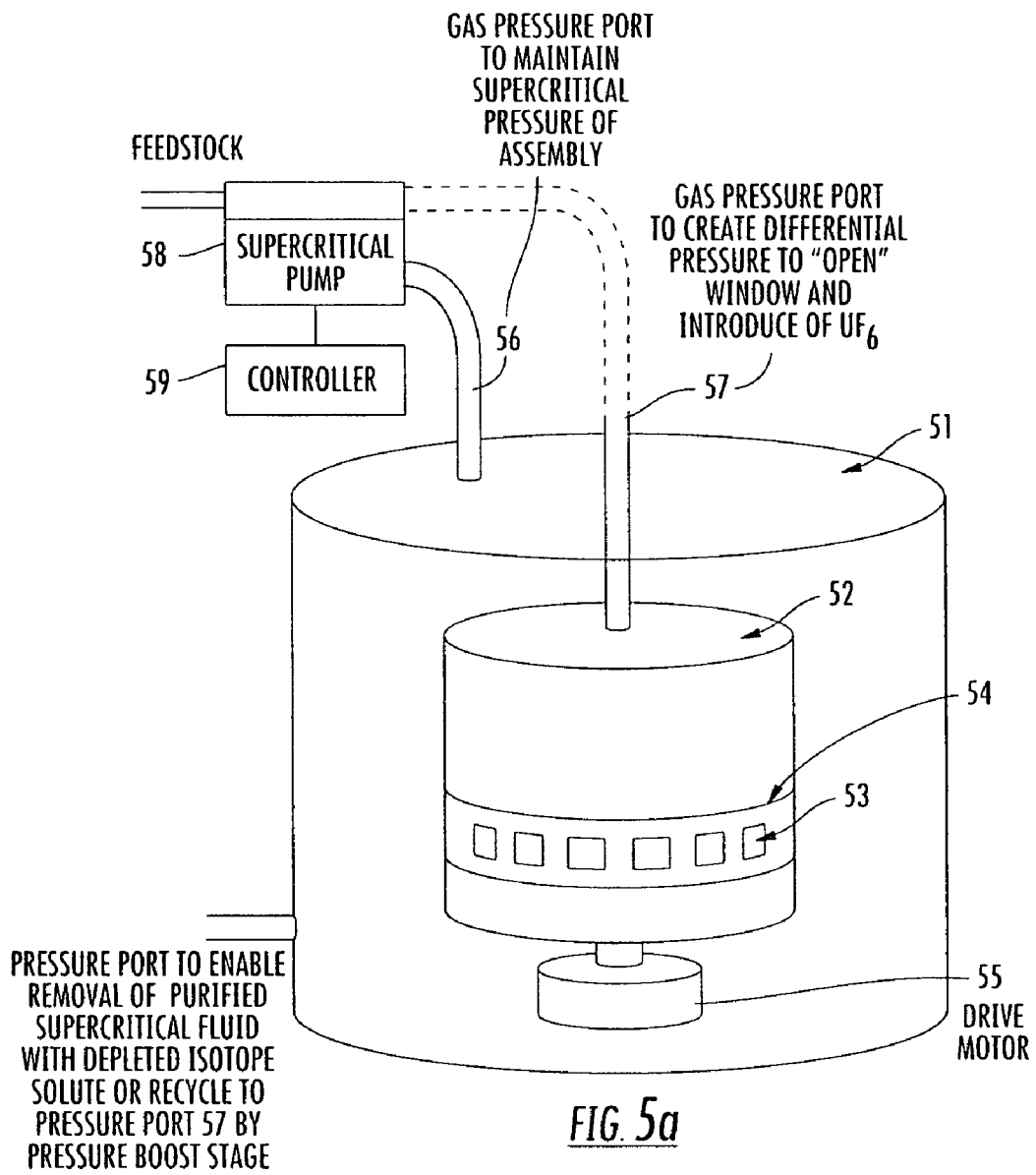
FIG. 5a is an exemplary illustration of a stage of a super critical fluid isotope enrichment system according principles of the invention.

Referring to FIG. 5a there is shown an exemplary illustration of a stage of a super critical fluid isotope enrichment system according principles of the invention. The provided system and method for supercritical fluid enrichment of radioactive isotopes uses a supercritical sampling device to enrich $U^{235}$ as well as for the purification of plutonium, other radioactive and non-radioactive isotopes.

An outer chamber 51 is maintained at supercritical pressure as is the inner chamber 52 by supercritical pump 58. The inner chamber 52 contains a window/s or channel/s 53 formed of a material which is resistant to perfusion and/or diffusion at pressures less than that required to drive the depleted heavier isotope fraction, $U^{238}F_6$ through the "window" for the ratio of isotopes present (this will vary from cycle to cycle as will the pressure) in the current stage of enrichment. Super critical extraction fluid, enriched in $U^{235}F_6$ is contained within the inner chamber 52.

Figure 5B:
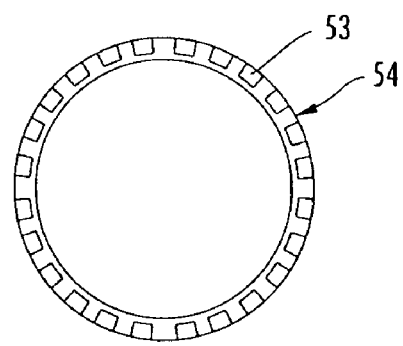
FIG. 5b is an alternative view of the window washer structure including a plurality of windows.

FIG. 5b is provides an illustration of a window ring structure including a plurality of windows. The window ring structure 54 contains the window 53 formed of material which is resistant to perfusion and/or diffusion at pressures less than those required to drive the depleted heavier isotope fraction $U^{238}F_6$ through the "window" for the ratio of isotopes present (this will vary from cycle to cycle as will the pressure) in the current stage of enrichment. Controller 59 provides computerized control of the timing, magnitude and/or duration of the differential pressure produced in each of stage of the system. The timing, magnitude and/or duration of the differential pressure may vary from stage to stage and this variation may be synchronized with measured feedstock volume, feedstock flow rate, target isotope concentration in feedstock, feedstock mass, inner chamber rotational time, number of inner chamber rotations, inner chamber rotations since a most recent opening of the window, or inner chamber rotations from a most recent closure of the window.

Rotational drive motor 55 is coupled to the inner chamber 52 to generate the necessary rotation for centrifugal separation of the isotopes and is controlled by controller 59. Pressure port 56 maintains the super critical pressure of the outer chamber 51. Inner chamber pressure port 57 is maintained at pressure at least that of the outer chamber and is thereafter pulsed at a sufficient pressure to enable the opening of the windows 53.

By 'opening the window" is meant that the molecular species geometrically closest to the window is enabled to pass through a channel through the window. These closest molecular species are positioned such by the centrifugal influence of the device. Precursor window material may be zeolite alumina formulations with vapor deposited samarium, rubidium, palladium, nickel or other material resistant to chemical reaction with the feedstock in use on a foundation. Other window embodiments may include metal sponge geometries or combination of the chemical vapor deposition and sponge geometries.

The material to be purified or enriched such as $U^{235}F_6$ is added to the inner chamber 52. The inner chamber 52 containing the window ring 54 is spun (centrifuged). At predetermined periods of time corresponding to the initial mix ratio of $U^{235}F_6$ to supercritical fluid volume, a suitable differential pressure is applied to the inner chamber 52 with respect to the outer chamber 51, thus "opening" the windows at the specific differential pressure, and allowing the depleted $U^{235}F_6$ isotope fraction to pass through the windows 53 into outer chamber 1. This cycle may be repeated for multiple stages.

The supercritical fluid isotope enrichment system will typically require a lesser number of stages or cascades than the gas centrifuge enrichment system requires to produce product enriched to a predetermined concentration. For example, to get 99% pure $U^{235}F_6$, the gas centrifuge enrichment system requires roughly 4000 stages.

A more detailed description of molecular windows (channels) is provided in "Application of H-ZSM-5 Zeolite for Regioselective Mononitration of Toluene", The Journal of Organic Chemistry 1994, 59, 4939-4942 and is incorporated by reference herein as if fully set out.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

The invention claimed is:

1. A method for supercritical fluid enrichment of isotopes, the method comprising the steps of:
   pressurizing a first enrichment stage to a supercritical pressure, the first enrichment stage having an outer chamber and an inner chamber, the inner chamber including at least one window, the window is formed from samarium, rubidium, palladium, nickel or other material resistant to chemical reaction with the feedstock in use;
   supplying at supercritical pressure a feedstock including a target isotope to the inner chamber;
   spinning the inner chamber to centrifuge the feedstock; and
   producing a timing, magnitude and/or duration of differential pressure for opening and closing the at least one window between the inner chamber and the outer chamber from one or more of measurements of the feedstock volume, flow rate of the feedstock, target isotope concentration in the feedstock, mass of the feedstock, rotational time of the inner chamber, number of rotations of the inner chamber since a most recent opening of the at least one window, or number of rotations of the inner chamber from a most recent closure of the at least one window wherein a depleted heavier isotope of the feedstock having a lesser concentration of the target isotope than the feedstock passes through the at least one window from the inner chamber to the outer chamber when the at least one window is open.

2. The method for supercritical fluid enrichment of isotopes according to claim 1 further comprising:
   pressurizing a second enrichment stage to a supercritical pressure, the second enrichment stage having an outer chamber and an inner chamber including at least one window;
   supplying the enriched portion to the inner chamber of the second enrichment stage;
   spinning the inner chamber of the second enrichment stage to centrifuge the enriched portion; and
   producing a differential pressure between the inner chamber of the second enrichment stage and the outer chamber of the second enrichment stage wherein a secondarily depleted portion of the enriched portion passes through the at least one window of the second enrichment stage into the outer chamber of the second enrichment stage, the secondarily depleted portion having a lesser concentration of the target isotope than the enriched portion.

3. The method for supercritical fluid enrichment of isotopes according to claim 2 further comprising:
   repeating the steps of claim 2 until a final enriched portion that passes through a final enrichment stage has at least a predetermined concentration of the target isotope.

4. The method for supercritical fluid enrichment of isotopes according to claim 1 further comprising:
   supplying a solvent to the feedstock.

5. A method for supercritical fluid enrichment of isotopes, the method comprising the steps of:
   pressurizing a first depletion stage to a supercritical pressure, the first depletion stage having an outer chamber and an inner chamber including at least one window, the window is formed from samarium, rubidium, palladium, nickel or other material resistant to chemical reaction with the feedstock in use;
   supplying an enriched portion of the feedstock having a greater concentration of the target isotope than the feedstock from the inner chamber of the first enrichment stage to the inner chamber of the first depletion stage;
   spinning the inner chamber of the first depletion stage to centrifuge the enriched portion;
   producing a timing, magnitude and/or duration of differential pressure for opening and closing the at least one window between the inner chamber of the first depletion stage and the outer chamber of the first depletion stage from one or more of measurements of the feedstock volume, flow rate of the feedstock, target isotope concentration in the feedstock, mass of the feedstock, rotational time of the inner chamber, number of rotations of the inner chamber since a most recent opening of the at least one window, or number of rotations of the inner chamber from a most recent closure of the at least one window wherein a subsequent depleted portion of the enriched portion passes through the at least one window of the first depletion stage when the window is open into the outer chamber of the first depletion stage.

6. The method for supercritical fluid enrichment of radioactive isotopes according to claim 1 wherein the target isotope is a radioactive isotope.

7. The method for supercritical fluid enrichment of isotopes according to claim 1 wherein the step of producing a timing, magnitude and/or duration of differential pressure comprises providing the differential pressure for a predetermined period of time.

8. An apparatus for supercritical fluid enrichment of isotopes, the apparatus comprising:
   a stage having an outer chamber and an inner centrifugal chamber for spinning a feedstock, the inner centrifugal chamber including at least one window, the window is formed from samarium, rubidium, palladium, nickel or other material resistant to chemical reaction with the feedstock in use;
   a first supercritical pump operative to produce a supercritical environment in the stage;
   a second supercritical pump operative to produce a differential pressure between the outer chamber and the inner centrifugal chamber; and
   a controller operative to direct the first supercritical pump and the second supercritical pump from one or more of measurements of the feedstock volume, flow rate of the feedstock, target isotope concentration in the feedstock, mass of the feedstock, rotational time of the inner chamber, number of rotations of the inner chamber since a most recent opening of the at least one window, or number of rotations of the inner chamber from a most recent closure of the at least one window;
   wherein the window is operative in response to application of differential pressure from the second supercritical fluid pump between the outer chamber and the inner centrifugal chamber to pass an isotopic portion of the feedstock from the inner chamber proximate the window to the outer chamber.

9. The apparatus for supercritical fluid enrichment of isotopes according to claim 8 further comprising:
   a plurality of stages, each stage having an outer chamber and an inner centrifugal chamber with at least one window, the plurality of stages connected in cascade.

10. The apparatus for supercritical fluid enrichment of isotopes according to claim 8 further comprising:

a plurality of stages, each stage having an outer chamber and an inner centrifugal chamber with at least one window, wherein a feedstock source is connected to the inner chamber of one of the plurality of stages, wherein the outer chamber of a first of the plurality of stages is connected to the inner chamber of a second of the plurality of stages, and wherein the inner chamber of the second of the plurality of stages is connected to the inner chamber of the first of the plurality of stages.

11. The apparatus for supercritical fluid enrichment of isotopes according to claim 8 wherein the controller is operative to vary at least one of timing, magnitude, or duration of the differential pressure produced.

12. The apparatus for supercritical fluid enrichment of isotopes according to claim 8 wherein the feedstock includes a solvent.

13. The apparatus for supercritical fluid enrichment of isotopes according to claim 8 wherein the first supercritical pump and the second supercritical pump are the same supercritical pump.

14. An apparatus for supercritical fluid enrichment of isotopes, the apparatus comprising:
a plurality of stages connected in cascade, each stage having an outer chamber and an inner centrifugal chamber for spinning material containing target isotope, the inner centrifugal chamber including at least one window, wherein the window is resistant to perfusion and/or diffusion at pressures less than a predetermined pressure required to drive an isotope though the window for a given target isotope concentration of the material provided to the inner centrifugal chamber of a given stage, wherein the window is operative to pass a depleted portion having a decreased concentration of the target isotope than the material provided to the inner chamber from proximate the window to the outer chamber in response to a predetermined differential pressure between the outer chamber and the inner centrifugal chamber for the stage, the window is formed from samarium, rubidium, palladium, nickel or other material resistant to chemical reaction with the feedstock in use;
a first supercritical pump operative to produce a supercritical environment in the plurality of stages;
a second supercritical pump operative to produce the differential pressure in the plurality of stages; and
a controller operative to command the first supercritical pump and the second supercritical pump from one or more of measurements of the feedstock volume, flow rate of the feedstock, target isotope concentration in the feedstock, mass of the feedstock, rotational time of the inner chamber, number of rotations of the inner chamber since a most recent opening of the at least one window, or number of rotations of the inner chamber from a most recent closure of the at least one window.

15. The apparatus for supercritical fluid enrichment of isotopes according to claim 14 wherein the controller is operative to vary at least one of timing, magnitude, or duration of the differential pressure produced in the plurality of stages.

16. A method for supercritical fluid enrichment of isotopes, the method comprising the steps of:
pressurizing a first stage to a supercritical pressure, the first stage having an outer chamber and an inner chamber, the inner chamber including at least one window, the window is formed from samarium, rubidium, palladium, nickel or other material resistant to chemical reaction with the feedstock in use;
supplying at supercritical pressure a feedstock including a target isotope to the inner chamber;
spinning the inner chamber to centrifuge the feedstock; and
producing a differential pressure between the inner chamber and the outer chamber from one or more of measurements of the feedstock volume, flow rate of the feedstock, target isotope concentration in the feedstock, mass of the feedstock, rotational time of the inner chamber, number of rotations of the inner chamber since a most recent opening of the at least one window, or number of rotations of the inner chamber from a most recent closure of the at least one window wherein first portion of the feedstock having a first concentration of the target isotope passes though the at least one window from the inner chamber to the outer chamber when the at least one window is open, and wherein a second portion of the feedstock having a second concentration of the feedstock remains in the inner chamber.

17. The method for supercritical fluid enrichment of isotopes according to claim 16 further comprising:
pressurizing a second stage to a supercritical pressure, the second stage having an outer chamber and an inner chamber including at least one window;
supplying the first portion or the second portion to the inner chamber of the second stage;
spinning the inner chamber of the second stage to centrifuge the first portion or the second portion; and
producing a differential pressure between the inner chamber of the second stage and the outer chamber of the second stage from one or more of measurements of the feedstock volume, flow rate of the feedstock, target isotope concentration in the feedstock, mass of the feedstock, rotational time of the inner chamber, number of rotations of the inner chamber since a most recent opening of the at least one window, or number of rotations of the inner chamber from a most recent closure of the at least one window wherein a first secondarily separated portion passes though the at least one window of the second stage into the outer chamber of the second stage and a second secondarily separated portion remains in the inner chamber of the second stage, the first secondarily separated portion having a third concentration of the target isotope and the second secondarily separated portion having a fourth concentration of the target isotope.

18. The method for supercritical fluid enrichment of isotopes according to claim 17 further comprising:
iteratively processing the first secondarily separated portion or the second secondarily separated portion through a plurality of stages until a final portion having at least a predetermined concentration of the target isotope remains in the inner chamber of a final stage or passes through the at least one window of a final stage to the outer chamber of the final stage.

19. The apparatus for supercritical fluid enrichment of isotopes according to claim 8 further comprising:
a plurality of stages, each stage having an outer chamber and an inner centrifugal chamber with at least one window, wherein a feedstock source is connected to the inner chamber of one of the plurality of stages, wherein the inner chamber of a first of the plurality of stages is connected to the inner chamber of a second of the plurality of stages, and wherein the outer chamber of the second of the plurality of stages is connected to the inner chamber of the first of the plurality of stages.

* * * * *